United States Patent
Lumens

(10) Patent No.: US 9,322,702 B2
(45) Date of Patent: Apr. 26, 2016

(54) DETECTING THE DIRECTION OF ACOUSTIC SIGNALS WITH A FIBER OPTICAL DISTRIBUTED ACOUSTIC SENSING (DAS) ASSEMBLY

(75) Inventor: Paul Gerard Edmond Lumens, Rijswijk (NL)

(73) Assignee: Shell Oil Company, Houston, TX (US)

( * ) Notice: Subject to any disclaimer, the term of this patent is extended or adjusted under 35 U.S.C. 154(b) by 355 days.

(21) Appl. No.: 13/996,431

(22) PCT Filed: Dec. 20, 2011

(86) PCT No.: PCT/EP2011/073471
§ 371 (c)(1),
(2), (4) Date: Jun. 20, 2013

(87) PCT Pub. No.: WO2012/084997
PCT Pub. Date: Jun. 28, 2012

(65) Prior Publication Data
US 2013/0291643 A1 Nov. 7, 2013

(30) Foreign Application Priority Data

Dec. 21, 2010 (EP) .................................... 10196253
Jul. 21, 2011 (EP) .................................... 11174781

(51) Int. Cl.
| | | |
|---|---|---|
| *G01H 9/00* | (2006.01) | |
| *G01V 1/18* | (2006.01) | |
| *G01S 3/802* | (2006.01) | |
| *G01V 1/22* | (2006.01) | |
| *G01V 1/40* | (2006.01) | |

(52) U.S. Cl.
CPC ............... *G01H 9/006* (2013.01); *G01H 9/004* (2013.01); *G01S 3/802* (2013.01); *G01V 1/187* (2013.01); *G01V 1/226* (2013.01); *G01V 1/40* (2013.01)

(58) Field of Classification Search
CPC ....... G01H 9/004; G01H 9/006; G01V 1/187; G01V 1/226; G01V 1/40; G01S 3/802
USPC .......................................................... 73/655
See application file for complete search history.

(56) References Cited

U.S. PATENT DOCUMENTS

| 4,297,887 A | 11/1981 | Bucaro ........................... 76/655 |
| 4,363,533 A | 12/1982 | Stowe et al. ................ 350/96.33 |
| 4,405,198 A | 9/1983 | Taylor ........................ 350/96.29 |
| 4,979,798 A | 12/1990 | Lagakos et al. ............. 350/96.33 |
| 5,633,960 A | 5/1997 | Lagakos et al. ................. 385/12 |
| 6,268,911 B1 | 7/2001 | Tubel et al. |
| 6,281,489 B1 | 8/2001 | Tubel et al. |

(Continued)

FOREIGN PATENT DOCUMENTS

| GB | 2058394 | 4/1981 | ............... G02B 5/14 |
| GB | 2197953 | 6/1988 | ............... G01S 3/86 |

(Continued)

OTHER PUBLICATIONS

PCT International Search Report, Application No. PCT/EP2011/073471 dated Feb. 13, 2012.

*Primary Examiner* — J M Saint Surin

(57) ABSTRACT

A directionally sensitive Distributed Acoustic Sensing (DAS) fiber optical assembly comprises adjacent lengths of optical fiber (A,B) with different directional acoustic sensitivities, which are used to detect the direction (a) of acoustic signals relative to the lengths of optical fiber (A, B).

12 Claims, 1 Drawing Sheet

(56) References Cited

U.S. PATENT DOCUMENTS

| | | |
|---|---|---|
| 6,588,266 B2 | 7/2003 | Tubel et al. |
| 6,644,402 B1 | 11/2003 | Sharma et al. |
| 6,787,758 B2 | 9/2004 | Tubel et al. |
| 7,040,390 B2 | 5/2006 | Tubel et al. |
| 7,201,221 B2 | 4/2007 | Tubel et al. |
| 7,284,903 B2 | 10/2007 | Hartog |
| 7,668,411 B2 | 2/2010 | Davies et al. |
| 7,740,064 B2 | 6/2010 | McCoy et al. |
| 7,946,341 B2 | 5/2011 | Hartog et al. |
| 7,954,560 B2 | 6/2011 | Mathiszik et al. |
| 9,080,949 B2 * | 7/2015 | Mestayer ............... G01H 9/004 73/655 |
| 9,109,944 B2 * | 8/2015 | Den Boer ............... G01H 9/004 73/655 |
| 2002/0097636 A1 | 7/2002 | Vakoc |
| 2003/0043696 A1 | 3/2003 | Vakoc |
| 2003/0043697 A1 | 3/2003 | Vakoc |
| 2004/0043501 A1 | 3/2004 | Means et al. |
| 2004/0076222 A1 | 4/2004 | De Francesco et al. |
| 2005/0060142 A1 | 3/2005 | Visser et al. |
| 2007/0038442 A1 | 2/2007 | Visser et al. |
| 2007/0297807 A1 | 12/2007 | Chen et al. |
| 2009/0188665 A1 | 7/2009 | Tubel et al. |
| 2009/0240495 A1 | 9/2009 | Ramakrishnan et al. |
| 2010/0025048 A1 | 2/2010 | Franzen |
| 2010/0107754 A1 | 5/2010 | Hartog et al. |
| 2010/0207019 A1 | 8/2010 | Hartog et al. |
| 2010/0315630 A1 | 12/2010 | Ramos et al. |
| 2011/0044574 A1 | 2/2011 | Strong |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0280103 A1 | 11/2011 | Bostick, III |
| 2011/0292763 A1 | 12/2011 | Coates et al. |
| 2011/0320147 A1 * | 12/2011 | Brady .................... G01V 1/40 702/66 |
| 2012/0017687 A1 | 1/2012 | Davis et al. |
| 2012/0018149 A1 | 1/2012 | Fidan et al. |
| 2012/0060615 A1 | 3/2012 | Farhadiroushan et al. |
| 2012/0067126 A1 | 3/2012 | Hartog et al. |
| 2012/0127459 A1 | 5/2012 | Handerek |
| 2012/0179390 A1 | 7/2012 | Kimmiau et al. |
| 2012/0188533 A1 | 7/2012 | Crickmore et al. |
| 2012/0230628 A1 | 9/2012 | Hill et al. |
| 2012/0230629 A1 | 9/2012 | Hill et al. |
| 2012/0255362 A1 | 10/2012 | Den Boer et al. |
| 2013/0061688 A1 | 3/2013 | Hayward |
| 2013/0090867 A1 | 4/2013 | Strong |
| 2013/0100768 A1 | 4/2013 | Lopez et al. |
| 2013/0211726 A1 | 8/2013 | Mestayer et al. |
| 2013/0291642 A1 * | 11/2013 | Crickmore ............. G01H 9/004 73/655 |
| 2014/0290372 A1 * | 10/2014 | Lagakos ................ G01H 9/004 73/655 |

FOREIGN PATENT DOCUMENTS

| | | | |
|---|---|---|---|
| GB | 2298276 | 8/1996 | ............. G01S 3/808 |
| GB | 2364380 | 1/2002 | |
| GB | 2518359 * | 3/2015 | ......... G01D 5/35358 |
| JP | 2001124529 | 11/2001 | |
| WO | 2009158630 | 12/2009 | |
| WO | WO2010136764 | 12/2010 | |
| WO | WO2011058313 | 5/2011 | ............... G01H 9/00 |
| WO | WO2011058314 | 5/2011 | ............... G01H 9/00 |
| WO | 201167554 | 6/2011 | |
| WO | WO2012123760 | 9/2012 | |

* cited by examiner

DETECTING THE DIRECTION OF ACOUSTIC SIGNALS WITH A FIBER OPTICAL DISTRIBUTED ACOUSTIC SENSING (DAS) ASSEMBLY

FIELD OF THE INVENTION

The invention relates to fiber optic devices and in particular to a fiber optical Distributed Acoustic Sensing (DAS) assembly adapted to sense the direction of acoustic signals that are travelling at an angle or substantially perpendicular to the DAS assembly.

BACKGROUND OF THE INVENTION

Various attempts have been made to provide sensing capabilities in the context of petroleum exploration, production, and monitoring, with varying degrees of success. Recently, these attempts have included the use of fiber optic cables to detect acoustic energy. Because the cables typically comprise optically conducting fiber containing a plurality of backscattering inhomogeneities along the length of the fiber, such systems allow the distributed measurement of optical path length changes along an optical fiber by measuring backscattered light from a laser pulse input into the fiber. Because they allow distributed sensing, such systems are often referred to as "Distributed Acoustic Sensing" or "DAS" systems. One use of DAS systems is in seismic applications, in which seismic sources at known locations transmit acoustic signals into the formation, and/or passive seismic sources emit acoustic energy. The signals are received at seismic sensors after passing through and/or reflecting through the formation. The received signals can be processed to give information about the formation through which they passed. This technology can be used to record a variety of seismic information. Another application range is concerning in-well applications, such as flow- and event detection.

Known DAS assemblies with optical fibers having different acoustic sensitivities are disclosed in UK patent GB 2197953 and U.S. Pat. Nos. 4,297,887 and 4,405,198.

The DAS assembly known from U.S. Pat. No. 4,405,198 comprises twisted optical fibers that may be arranged in parallel with other like fibers and axes twisted at different pitches thereby enabling detection of sound waves over a range of frequencies and their angles of incidence.

While there exists a variety of commercially available DAS systems that have varying sensitivity, dynamic range, spatial resolution, linearity, etc., all of these systems are primarily sensitive to axial strain as the angle between direction of travel of the acoustic signal and the fiber axis approaches 90°, DAS cables become much less sensitive to the signal and may even fail to detect it.

Thus, it is desirable to provide an improved cable that is more sensitive to signals travelling normal to its axis and enables distinguishing this radial strain from the axial strain. Such signals travelling normal to the longitudinal axis of the fiber may sometimes be referred to as "broadside" signals and result in radial strain on the fiber. Sensitivity to broadside waves is particularly important for seismic or microseismic applications, with cables on the surface or downhole.

Furthermore, there is a need to provide an improved method for detecting the direction of acoustic signals relative to a longitudinal axis of fiber optical DAS assembly.

SUMMARY OF THE INVENTION

In accordance with the invention there is provided a directionally sensitive Distributed Acoustic Sensing (DAS) fiber optical assembly comprising at least two substantially parallel lengths of adjacent optical fiber with different directional acoustic sensitivities, wherein the at least two lengths of adjacent optical fiber comprise a first length of optical fiber A with a first ratio between its axial and radial acoustic sensitivity and a second length of optical fiber B with a second ratio between its axial and radial acoustic sensitivity; and an algorithm is provided for detecting a direction of propagation of an acoustic signal relative to a longitudinal axis of the first and second lengths of optical fiber on the basis of a comparison of differences of radial and axial strain in the first and second lengths of optical fiber resulting from the acoustic signal.

The first ratio may be between 300 and 1000 and the second ration may be between 100 and 300.

The at least two lengths of adjacent optical fiber may comprise a first length of coated fiber having a first coating, such as an acrylate coating, and a second length of coated fiber having a second coating, such as a copper coating, wherein the first and second coatings are selected such that the Young's Modulus or Poisson's ratio of the first length of coated fiber is less than the Young's Modulus or Poisson's ratio of the second length of coated fiber.

Alternatively or additionally the at least two lengths of adjacent optical fiber comprise a first length of optical fiber with a first diameter and a second length of optical fiber with a second diameter.

Optionally, the at least two lengths of adjacent optical fiber comprise adjacent sections of a single fiber optic cable having a coating with at least one property that varies along the length of the cable, the at least one property being selected from the group consisting of Poisson's ratio and Young's modulus.

In accordance with the invention there is furthermore provided a directionally sensitive Distributed Acoustic Sensing (DAS) method, which comprises providing a (DAS) fiber optical assembly comprising at least two substantially parallel lengths of adjacent optical fibers with different directional acoustic sensitivities, wherein the at least two lengths of adjacent optical fiber comprise a first length of optical fiber with a first ratio between its axial and radial acoustic sensitivity and the second length of optical fiber with a second ratio between its axial and radial acoustic sensitivity; and deploying an algorithm for detecting a direction of propagation of an acoustic signal relative to a longitudinal axis of the first and second lengths of optical fiber on the basis of a comparison of differences of radial and axial strain in the first and second lengths of optical fiber resulting from the acoustic signal.

These and other features, embodiments and advantages of the Distributed Acoustic Sensing (DAS) fiber optical assembly and method according to the invention are described in the accompanying claims, abstract and the following detailed description of non-limiting embodiments depicted in the accompanying drawings, in which description reference numerals are used which refer to corresponding reference numerals that are depicted in the drawings.

BRIEF DESCRIPTION OF THE DRAWINGS

For a more detailed understanding of the invention, reference is made to the accompanying drawings wherein.

DETAILED DESCRIPTION OF A PREFERRED EMBODIMENT

Figure 1:
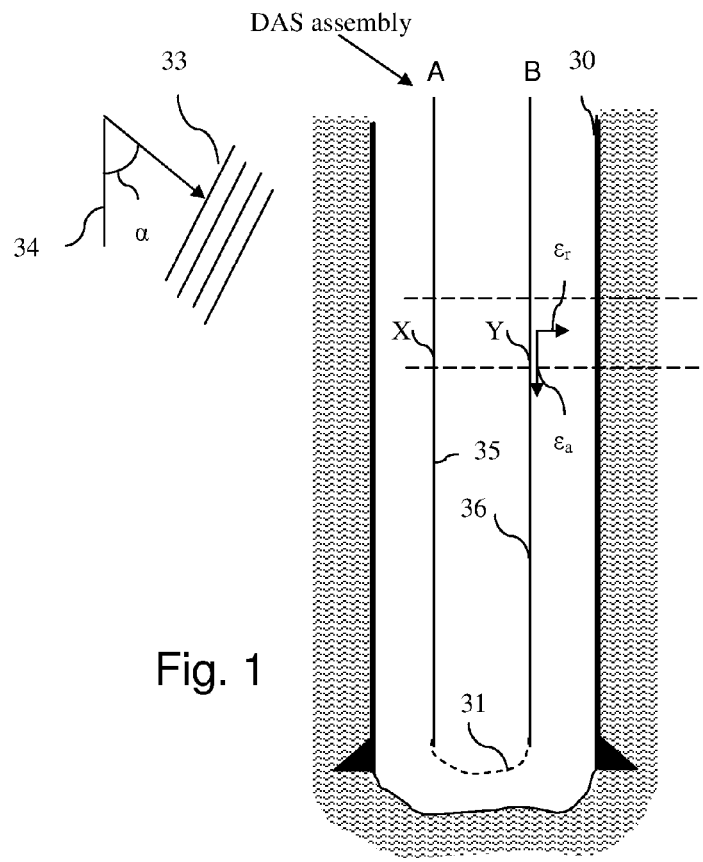
FIG. 1 is a schematic view of a directionally sensitive fiber optical DAS assembly in a well and a graphical and physical explanation of its directional sensitivity.

Although fiber optical DAS cables are better at detecting axial strain, they can detect radial strain as a result of the Poisson effect or strain-optic effect. When radial strain is applied to the fiber, the fiber expands in the axial direction or directly induces a radial strain on the fiber leading to a change in refractive index. The amount of axial strain that is induced by the radial strain is determined by the Poisson ratio, which is a material property of the optical fiber. For most materials, the Poisson's ratio is between 0 and 0.5 (although some exotic materials can have negative values). The amount of refractive index change that is induced by radial strain is determined by the strain-optic coefficients.

As a result of the magnitude of the various strain transfer effects, seismic data recorded using a DAS system will contain signals resulting primarily from waves that are in line with the fiber and smaller signals resulting from waves that are incident perpendicular to the fiber. In the case of Poisson's ratio effects, a broadside seismic wave attempts to induce the same axial strain at every point on the fiber. By symmetry, the axial particle motion and hence the movement of impurities that lead to detection in a DAS system, is zero or near-zero. Hence, radial strain transfer in a uniform situation is mainly governed by strain-optic effects.

In some embodiments, the present invention seeks to resolve the parallel and perpendicular components using a novel fiber optic cable deployment and post-processing scheme effectively generating distributed multi-component seismic data. The degree to which radial strain is converted to axial strain in the fiber can be tailored by coating the fiber with materials that have a larger or smaller Young's Modulus or Poisson's ratio.

Similarly, by axially varying other material properties, such as the Young's modulus (stiffness) of the fiber, along the length of the fiber, it may be possible to induce axial strain modulation in the fiber using a broadside wave. Other properties of the fiber, coating or sheath material can be varied, and may be selected depending on the elasticity, isotropy, and homogeneity of the material(s).

In preferred embodiments, the heterogeneous fiber with varying Poisson ratio and/or Young's modulus is suspended in a fluid, so that it is not constrained to deform with the formation. The fluid could be water or another incompressible fluid.

The embodiments described herein can be used advantageously in alone or in combination with each other and/or with other fiber optic concepts. Similarly, the variations described with respect to fiber coatings can be applied using the same principles to the cable jacket including changing properties of a possible gel in the cable.

The DAS methods and DAS assemblies described herein can likewise be used to detect microseisms and the data collected using the present invention, including broadside wave signals, can be used in microseismic localization. In these embodiments, the data are used to generate coordinates of a microseism.

In still other applications, the DAS methods and DAS assemblies described herein can be used to measure arrival times of acoustic signals and in particular broadside acoustic waves. Arrival times give information about the formation and can be used in various seismic techniques.

In still other applications, ability of the DAS assemblies to detect broadside waves and axial waves distinguishably can be used in various DAS applications, including but not limited to intruder detection, monitoring of traffic, pipelines, or other environments, and monitoring of various conditions in a borehole, including fluid inflow.

FIG. 1 is a schematic view of a well in which a directionally sensitive fiber optical DAS assembly according to the invention is arranged.

The DAS assembly shown in FIG. 1 comprises two adjacent lengths of optical fiber A and B with different directional acoustic sensitivities. The two adjacent lengths of optical fiber A and B may be different fibers that are suspended substantially parallel to each other in the well 30, or may be interconnected by a fiber optical connection 31, or may be different parts of a single U-shaped optical fiber of which the different parts have different directional sensitivities.

To create multi-directional sensitivity, both along cable (axial) and perpendicular to cable (radial) acoustic/strain amplitudes $\epsilon_a$ and $\epsilon_r$ may be detected and processed as shown in Equations (1) and (2).

In FIG. 1 an acoustic wavefront 33 is travelling at an angle α towards adjacent channels X and Y of the lengths of optical fiber A and B and thereby generate an axial strain $\epsilon_a$ and a radial strain $\epsilon_r$ in these lengths of optical fiber A and B, which axial and radial strains $\epsilon_a$ and $\epsilon_r$ detected by analyzing differences in reflections of optical signals transmitted through the lengths of optical fiber A and B, which reflections stem, on the basis of a time of flight of analysis, from channels X and Y. This can be used: as a "2D" geophone that measures the angle α between the direction of the wavefront 33 and a longitudinal axis 34 of the well 30, or to determine the angle of incidence α (directivity) of the acoustic wave front 33 relative to the longitudinal axis 34 of the well 30. This requires measuring by at least two lengths of fiber A and B simultaneously. The axial/radial sensitivity ratio of these two fibers should be different. The fibers should be in the same acoustic input wavefront 33 (i.e. close to each other, same coupling, etc.), be it different fibers in one cable assembly or multiple cable assemblies next to each other.

To control the ratio between axial and radial sensitivity $\epsilon_a$ and $\epsilon_r$ of the lengths A and B of optical fiber these lengths may be coated with different coatings. For example, the first length of optical fiber A may be coated with standard acrylate coating 35 whilst the second length of optical fiber B may be coated with a with a copper coating 36. The difference in Young's Modulus (and to a lower degree: Poisson's ratio), change the degree to which physical length and optical path length (speed of light) vary. This leads to a different ratio between axial and radial sensitivity resulting from different axial and radial strain $\epsilon_a$ and $\epsilon_r$ measured at channels X and Y and other channels along the lengths of optical fiber A and B.

Figure 2:
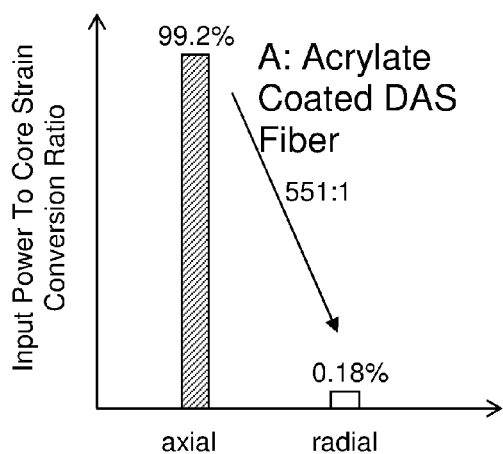
FIGS. 2 and 3 are plots showing exemplary ratios between the axial and radial strain and associated axial and radial acoustic sensitivity for acrylate- and copper-coated optical fibers, respectively.
Figure 3:
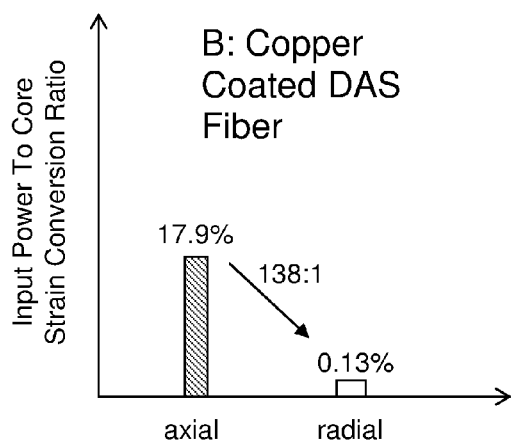

Depending on the acoustical environment, exemplary FIGS. 2 and 3 show that the ratio between the axial and radial strain and associated axial and radial acoustic sensitivity of the acrylate coated length of optical fiber A is about 551:1 and that the ratio between the axial and radial strain and associated axial and radial acoustic sensitivity of the copper coated length of optical fiber B is about 138:1. Different alternative coatings 35, 36 may be used, provided that these alternative coatings 35,36 result in different axial and radial acoustic sensitivities of the two lengths of optical fiber A and B, wherein the ratio of the axial and radial acoustic sensitivities of the first length of optical fiber A is preferably in the range between 300 and 1000 and the ratio between the axial and radial acoustic sensitivity of the second length of optical fiber B is preferably in the range between 100 and 300.

Equations (1) and (2) show how the directional sensitivities $\Delta\Phi_A^{DAS}$ and $\Delta\Phi_B^{DAS}$ are derived.

$$\Delta\phi_A^{DAS} = f(\varepsilon_{axial}^{outside}) + g(\varepsilon_{radial}^{outside}) \quad (1)$$

$$\Delta\phi_B^{DAS} = h(\varepsilon_{axial}^{outside}) + k(\varepsilon_{radial}^{outside}) \quad (2)$$

where the axial and radial strains $\varepsilon_a$ and $\varepsilon_r$, respectively, are measured at the outside of channels X and Y of the adjacent lengths of optical fiber A and B. When the ratio of the axial to radial strain is known for each cable are known, Equations 1 and 2 can be solved for the strain variables.

It will be understood that the control of axial/radial strain ratios may not only be achieved by providing the adjacent lengths of optical fiber with different fiber coatings, such as acrylate and copper, but can also be achieved by providing the adjacent lengths of optical cable A and B with different properties, such as different Young's Modulus of any fiber layers, different diameters of fiber (layers), different properties of fillings (like gel) used in cable assemblies, for example different viscosity and Young's Modulus of such gels, different materials and thicknesses used for metal tubes in cable assemblies and/or alternating properties along the lengths of optical fiber A and B of the fiber optical DAS assembly according to the invention.

While preferred embodiments have been disclosed and described, it will be understood that various modifications can be made thereto.

What is claimed is:

1. A directionally sensitive Distributed Acoustic Sensing (DAS) fiber optical assembly comprising at least two substantially parallel lengths of adjacent optical fibers with different directional acoustic sensitivities, wherein the at least two lengths of adjacent optical fiber comprise a first length of optical fiber with a first ratio between its axial and radial acoustic sensitivity and the second length of optical fiber with a second ratio between its axial and radial acoustic sensitivity; and an algorithm is provided for detecting a direction of propagation of an acoustic signal relative to a longitudinal axis of the first and second lengths of optical fiber on the basis of a comparison of differences of radial and axial strain in the first and second lengths of optical fiber resulting from the acoustic signal.

2. The DAS assembly of claim 1, wherein algorithm comprises the formula's:

$$\Delta\phi_A^{DAS} = f(\varepsilon_{axial}^{outside}) + g(\varepsilon_{radial}^{outside})$$

$$\Delta\phi_B^{DAS} = h(\varepsilon_{axial}^{outside}) + k(\varepsilon_{radial}^{outside})$$

for determining the axial and radial strains $\varepsilon_{axial}$ and $\varepsilon_{radial}$, respectively, incident at the outside of channels X and Y of the adjacent substantially straight lengths of optical fiber A and B by measuring the signals $\Delta\Phi_A^{DAS}$ and $\Delta\Phi_B^{DAS}$ of the first and second lengths of optical fiber A and B and wherein the factors f, g, h and k are empirically obtained factors relating to the ratio of sensitivity of the lengths of optical fiber A and B to axial and radial strain $\varepsilon_{axial}$ and $\varepsilon_{radial}$, respectively.

3. The DAS assembly of claim 1, wherein the first ratio is between 300 and 1000 and the second ratio is between 100 and 300.

4. The DAS assembly of claim 1, wherein the at least two lengths of adjacent optical fiber comprise a first length of coated fiber having a first coating and a second length of coated fiber having a second coating, wherein the first and second coatings are selected such that the Young's Modulus and Poisson's ratio of the first length of coated fiber is less than the Young's Modulus and Poisson's ratio of the second length of coated fiber.

5. The DAS assembly of claim 1, wherein the first length of optical fiber has an acrylate coating and the second length of optical fiber has a copper coating.

6. The DAS assembly of claim 1, wherein the at least two lengths of adjacent optical fiber comprise a first length of optical fiber with a first diameter and a second length of optical fiber with a second diameter.

7. The DAS assembly of claim 1, wherein the at least two lengths of adjacent optical fiber comprise adjacent sections of a single fiber optic cable having a coating with at least one property that varies along the length of the cable, the at least one property being selected from the group consisting of Poisson's ratio and Young's modulus.

8. The DAS assembly of claim 1, wherein the adjacent lengths of optical cable with different directional acoustic properties comprise at least one of the following features:
adjacent lengths of optical cable having a different Young's Modulus;
adjacent lengths of optical cable with different diameters;
adjacent lengths of optical cable comprising fiber layers having a different Young's Modulus;
adjacent lengths of optical cable comprising fiber layers having different inner and/or outer diameters;
adjacent lengths of optical cable comprising annular fiber layers filled with fillings, such as gels having different properties, such as different viscosities and/or Young's Modulus;
adjacent lengths of optical cable surrounded by metal tubes having a different Young's Modulus, different material compositions, and/or thicknesses;
adjacent lengths of optical cable having varying and/or alternating acoustic properties along the length thereof.

9. A directionally sensitive Distributed Acoustic Sensing (DAS) method, the method comprising providing a (DAS) fiber optical assembly comprising at least two substantially parallel lengths of adjacent optical fibers with different directional acoustic sensitivities, wherein the at least two lengths of adjacent optical fiber comprise a first length of optical fiber with a first ratio between its axial and radial acoustic sensitivity and the second length of optical fiber with a second ratio between its axial and radial acoustic sensitivity; and deploying an algorithm for detecting a direction of propagation of an acoustic signal relative to a longitudinal axis of the first and second lengths of optical fiber on the basis of a comparison of differences of radial and axial strain in the first and second lengths of optical fiber resulting from the acoustic signal.

10. The directionally sensitive DAS method of claim 9, wherein algorithm comprises the formula's:

$$\Delta\phi_A^{DAS} = f(\varepsilon_{axial}^{outside}) + g(\varepsilon_{radial}^{outside})$$

$$\Delta\phi_B^{DAS} = h(\varepsilon_{axial}^{outside}) + k(\varepsilon_{radial}^{outside})$$

for determining the axial and radial strains $\epsilon_{axial}$ and $\epsilon_{radial}$, respectively, incident at the outside of channels X and Y of the adjacent substantially straight lengths of optical fiber A and B by measuring the signals $\Delta\Phi_A^{DAS}$ and $\Delta\Phi_B^{DAS}$ of the first and second lengths of optical fiber A and B and wherein the factors f, g, h and k are empirically obtained factors relating to the ratio of sensitivity of the lengths of optical fiber A and B to axial and radial strain $\epsilon_{axial}$ and $\epsilon_{radial}$, respectively.

11. The directionally sensitive DAS method according to claim 9, wherein the DAS method is used to monitor and/or control features of a subsurface formation and/or subsurface flux of fluid through a formation into a well and/or fluid flux through a subsurface well assembly.

12. The method according to claim 11, wherein the directionally sensitive DAS method is used to monitor, manage and/or control the flux of hydrocarbon fluids through a subsurface formation and/or through a hydrocarbon fluid production well assembly.

* * * * *